3,420,796
**METHOD OF PREPARING POWDERED
POLYURETHANE RESINS**
Kanji Matsubayashi and Takuo Kawaguchi, Kurashiki,
 Japan, assignors to Kurashiki Rayon Co., Ltd., Kurashiki, Japan
No Drawing. Filed Sept. 7, 1965, Ser. No. 485,617
Claims priority, application Japan, Oct. 31, 1964,
39/61,480
U.S. Cl. 260—47      9 Claims
Int. Cl. C08g 22/18; C08g 22/06; C08g 22/04

ABSTRACT OF THE DISCLOSURE

Powdered polyurethane resins are prepared by reacting a polyhydroxyl compound having a molecular weight of 300 to 8000, an organic diisocyanate and a low molecular weight diol, in the presence of 5 to 60% based on the weight of the sum of said three reactants and the solvent, of the solvent which is selected from the group consisting of furan, tetrahydrofuran, methylfurans, dioxane, methyl-α-furfuryl ethers, 2,3-dihydropyran, tetrahydropyran, pentamethylene oxide, 1,8-cineol, 1,2-dimethoxyethane, 1-methoxy-2-butoxyethane, dichloroethyl ether, dichloromethyl ether, dibutyl ether, methyl chloromethyl ether, benzyl ethyl ether, benzyl methyl ether, anisol, phenetole, diallyl ether and allyl vinyl ether, while continuously mechanically pulverizing the reaction mixture.

---

This invention relates to a method of preparing polyurethane resins and in particular to a method of preparing polyurethane resins in powder form, which method is characterized by reacting under heat a high molecular weight polyhydroxyl compound having terminal hydroxyl groups with an organic polyisocyanate and a low molecular weight polyol using as solvent an ether capable of dissolving the major portion of the resulting polymer in a blender provided with crushing means and continuously pulverizing the resulting polymer.

The products of this improved method are obtained directly in powdered form and are characterized by good homogeneity, narrow molecular weight distribution, substantial absence of oligomers and easy and ready solution in tetrahydrofuran, dimethylformamide and other conventional solvents.

In the synthesis of polyurethane elastomers from a three component composition consisting of a high molecular weight polyhydroxyl compound having terminal hydroxyl groups, an organic polyisocyanate and a low molecular weight polyol, there has been found a method which comprises pouring the molten mixture of the three components on a hot plate to effect heat reaction, thereby to obtain a resin in sheet form. In this method, however, the reaction proceeds during the step of the preparation of the molten mixture because of accumulation of heat energy caused by the exothermic reaction, so that the sheet-formed resin thus formed has unsatisfactory homogeneity and a wide range of molecular weight distribution. Another method, hitherto known, comprises reacting a mixture consisting of said three components only under heat with stirring or kneading and stopping the reaction before complete curing of the reaction mixture to prepare curable polyurethane. Still another method, hitherto known, comprises stopping halfway the heat reaction of the mixture consisting of said three components by cooling, pulverizing the product and finishing the reaction of the reaction mixture in the form of granules. The polyurethane resins prepared in these methods also have a very wide range of molecular weight distribution and cause trouble by forming oligomers during the period after processings.

The first object of the present invention is to provide polyurethane resins having a good homogeneity and a narrow range of molecular weight distribution by reaction between a high molecular weight polyhydroxyl compound, an organic polyisocyanate and a low molecular weight polyol using as solvent therefor an ether. A solution in a good solvent such as dimethylformamide (DMF), of such polyurethane resin having a poor homogeneity and a wide range of molecular weight distribution as prepared in the prior art educes a large quantity of oligomers during coagulation or extraction processes when used as binders or in casting films or wet spinning of elastic yarns; the educing of oligomers is a significant obstacle to such procedures. On the contrary, when there is used a polyurethane resin prepared by the method of the present invention, the educing of oligomers scarcely occurs and there is no problem in processing and loss in weight of the resin does not occur in the processing. While the exact mechanism which brings about this advantage has not been determined with certainty, this advantage is peculiar to the resin which has been prepared by reacting under heat a high molecular weight polyhydroxyl compound with an organic polyisocyanate and a low molecular weight polyol in an ether as solvent, and the resins prepared in a similar manner with the method of the invention but using as solvent methyl ethyl ketone, methyl isobutyl ketone, benzene, toluene, chloroform or like other solvents have wide ranges of molecular weight distribution and cause the problem of the educing of large quantities of oligomers.

Another object of the invention is to provide polyurethane resins in powder form having a good homogeneity which easily and uniformly dissolve in various solvents. For instance, the solubilities in tetrahydrofuran (THF) of polyurethane resins which have been prepared in separate methods form a ternary mixture of a polyethylene propylene adipate of a molecular weight of 1915 in which the mole ratio of ethylene glycol to propylene glycol is 9:1, diphenylmethane diisocyanate and 1,4-butanediol, in the mole ratio of 1.0:5.0:4.0 are summarized in the following table.

| Methods | Solubility in THF |
|---|---|
| (A) A polymer prepared in a bulk polymerization in which the three components are reacted under heat in the form of a sheet. | Hazy solution. |
| (B) A polymer prepared by reacting a molten mixture of the three components under heat, cooling halfway to stop the reaction and pulverizing the product. | Do. |
| (C) A polymer prepared in the method of this invention using as solvent THF, which is eliminated from the resin after completion of reaction. | Clear solution. |

The solubility in THF of the polyurethane resin which has been prepared in the method of the invention is singular, as indicated by the above table, and the resin dissolves in THF to a clear solution. It is believed that the polyurethane resin prepared in accordance with the present invention has a molecular structure different from those of the resins prepared in the other methods. As set forth above, the polyurethane resin prepared in accordance with the invention has a good solubility and is in the form of powder, so that it is soluble within a short period of time to form a polyurethane resin solution.

In carrying out the invention, the polyhydroxyl compound having terminal hydroxyl groups and a molecular weight of 300–8,000, the organic polyisocyanate and the low molecular weight polyol are used in such proportions so that the mole number of the organic polyisocyanate is substantially equal to the total mole number of the other two components. In particular, it is preferred to use the components in proportions so that the NCO/OH ratio in the whole reaction mixture is 0.90–1.15. As the solvent for the reaction mixture, there may be employed ethers that have a good affinity for polyurethanes and are capable of dissolving the major portion of, say at least 80% of the resulting polymer, and more preferred are cyclic ethers. In the initial stage of the heat reaction the reaction mixture is a clear, highly viscous liquid but, as polymerization proceeds, it becomes solid and is pulverized to a powder. If the working of the blender is stopped halfway and the highly viscous polymerization product is once cooled to solid state, it becomes impossible to set the blender again working to pulverize the polymerization product. That is, it is necessary to conduct the heat reaction between said three components in an ether to raise the viscosity of the reaction mixture and the continuous pulverization of the reaction mixture. If the solvent is used in an amount of more than 60% of the total charge of the reaction mixture, the pulverization does not occur, so that it is necessary for obtaining a powdered homogeneous polyurethane resin having a narrow molecular weight distribution to use the ether as solvent in an amount of 5–60% of the total charge.

In the method of the invention, there may be added as catalyst amines or tin compounds for accelerating the polyurethane-forming reaction between said three components. It is preferred to eliminate the ether, catalyst and other volatile matters from the reaction product when the product prepared by using as catalyst an amine is stored in solution in, e.g., dimethylformamide, dimethylacetamide, dimethylsulfoxide or like solvent for a long period of time because the amine catalyst functions also as a depolymerization catalyst and causes depression in solution viscosity of the solution.

As the polyhydroxyl compounds having terminal hydroxyl groups preferably used in the invention are polyesters, polyester ethers, polyethers and the like having molecular weights of 300–8,000. In addition thereto, there may also be used polyacetals, polyoxysilanes and mixtures of such polyhydroxyl compounds. As the polyesters suitably used are polyesters as prepared by polycondensation of aliphatic dibasic acids, such as adipic acid or sebacic acid, with glycols, such as ethylene glycol, propylene glycol, butylene glycol, hexamethylene glycol, dihydroxymethylcyclohexanes or the like, and polyacetones prepared by addition polymerization of lactones,such as polycaprolactone. There may also be used polyether esters prepared by polycondensation of aliphatic dicarboxylic acids, such as adipic acid, sebacic acid, succinic acid or the like, with glycols, such as diethylene glycol, triethylene glycol, tetraethylene glycol or the like.

The polyether suitably used as polyethylene glycol, polypropylene glycol, polytetramethylene glycol (polybutylene glycol) and like polyalkylene glycols.

The organic polyisocyanate suitably used includes, for instance, naphthylene diisocyanates, diphenylmethane diisocyanates, diphenyl diisocyanates, toluylene diisocyanates, m- and p-phenylene diisocyanates, diphenyl ether diisocyanates and the like. Aliphatic diisocyanates such as hexamethylene diisocyanate may also be used.

The low molecular weight polyols used in the method of the invention includes, for instance, ethylene glycol, propylene glycol, 1,2-butanediol, 1,3-butanediol, 2,3-butanediol, 1,4-butanediol, isomers of pentamethylene glycol, isomers of hexamethylene glycol, isomers of heptamethylene glycol, diethylene glycol, triethylene glycol, tetraethylene glycol, trimethylol propane, hexane triols, low molecular weight polyols having benzene nucleus such as p,p′-dioxyphenylalkanes, phenylene bis(hydroxyalkyl ethers), low molecular weight polyethylene terephthalate and like short chain polyesters, and the like. Also there may be used low molecular weight polyols having a molecular tertiary nitrogen atom such as, for example, N-methyldiethanolamine, N-ethyldiethanolamine, N-propyldiethanolamine, N-butyldiethanolamine, N-cyclohexyldiethanolamine, N-methyldiisopropanolamine, N-ethyldiisopropanolamine, N-propyldiisopropanolamine, N-butyldiisopropanolamine, phenyldiethanolamine, phenyldiisopropanolamine, tolyldiethanolamine, tolyldiisopropanolamine, α-methylbenzyldiethanolamine, α-methylbenzyliso-propanolamine and the like. In addition, there also may be used diol compounds having quaternary nitrogen atoms obtainable by reaction of such low molecular weight polyols having in the molecule a tertiary nitrogen atom with alkyl halides, alkylcarboxylates, alkyl esters of toluene-sulfonic acids and the like acids, such as, for example, N-dimethyl diethanol ammonium chloride, N-dimethyl diethanol ammonium methylsulfate, N-ethyl methyl diisopropanol ammonium acetate, N-phenyl diethanol methyl ammonium chloride, tolyl methyl diisopropanol ammonium methylsulfate, α-methyl benzyl ethanol ammonium methyl acetate, and the like. By using as a component of the polyurethane polymer such low molecular weight polyols having a tertiary or quaternary nitrogen atom, there may be obtained considerable improvements in dyeability, light fastness and yellowing resisting property. In the method of the invention there may be used mixtures of two or more such low molecular weight polyols.

The ethers to be used for the method of the invention are furan, tetrahydrofuran, methylfurans, dioxane, dioxene, methyl-α-furfuryl ethers, 2,3-dihydropyrane, tetrahydropyrane, pentamethylene oxide, 1,8-cineol, 1,2-dimethoxyethane, 1-methoxy-2-butoxyethane, dichloroethyl ether, dichloromethyl ether, dibutyl ether, ethyl chloromethyl ether, methyl chloromethyl ether, benzyl ethyl ether, benzyl methyl ether, anisol, phenetol, diallyl ether, allyl vinyl ether and the like.

The catalysts used in the invention for accelerating the urethane-forming reaction are triethylamine, dimethyl cyclohexylamine, tetramethyl propylene diamine, N-alkylmorphorines, and like tertiary amines, trimethyltin laurate, trimethyltin hydroxide, dibutyltin sulfate, antimonium tin chloride, dimethyltin dilaurate and like tin components, and ferric chloride, lead oleate, bismuth nitrate, ferric acetoacetate, alkali alcoholates, alkali phenolates and the like.

In the preparation of polyurethane resins in accordance with the invention, the preferred reaction temperature ranges between room temperature and 200° C. and the preferred reaction time ranges between several ten minutes and several ten hours. In general the reaction time is shortened by enlarging the scale of the reaction system because of accumulation of the reaction heat. The time necessary for pulverization of the resulting polymer varies depending upon the molar ratio of the reactants, the amount of the solvent used and the scale of the reaction system, and the pulverization usually starts within several ten hours. The time necessary for pulverization becomes shorter with increase in the amount of the solvent used, though when the amount of the solvent used is increased further, as large as 60% of the total charge, the time necessary for the pulverization becomes rather longer, and when the amount of the solvent used is increased to the extreme degree pulverization does not occur. It is preferred to keep the blender continuously working for a period of time as long as possible after the reaction mixture has polymerized to a satisfactory high degree of polymerization and freed from unreacted isocyanate groups and there has occurred pulverization thereof. As the pulverization is continued for a long period of time the powder is made finer. This is advantageous for elimination of solvent, catalyst and other volatile matters under heat and reduced pressure.

In the method of the invention there may be employed various types of blenders that have crushing means. Particularly suitable are Werner type blenders and kneader blenders.

The invention will now be illustrated by the following examples which are not limitative.

EXAMPLE 1

In a kneader blender of a capacity of 15 liters there were charged 1,200 g. of a polybutylene adipate having a hydroxyl value of 112 and an acid value of 0.4, 780 g. of diphenylmethane diisocyanate and 162 g. of 1,4-butanediol with 1,380 g. of tetrahydrofuran, and these were stirred for 15 minutes to dissolve the reactants completely and uniformly, after which there was added thereto a catalyst solution consisting of 5.8 g. of dibutyltin dilaurate in solution in 50 g. of tetrahydrofuran. After addition of the catalyst, warm water at 50° C. was circulated through the jacket of the kneader blender to effect heat reaction. With advance of the heat reaction the reaction mixture gradually became viscous and, after 20 minutes of heat reaction, it was converted to powder form. The stirring of the product in powder form was continued for an additional three hours and then the product was subjected to a reduced pressure of 100 mm. Hg at 50° C. for two hours to eliminate therefrom volatile matters. The dry, powdery polyurethane resin thus formed had an intrinsic viscosity as measured at 30° C. in dimethylformamide solution of 1.05 and exhibits a melting point of 151–1534 C.

EXAMPLE 2

Into a Werner type blender of a capacity of 35 liters there were charged 2,250 g. of a polybutylene adipate as used in Example 1, 1,480 g. of diphenylmethane diisocyanate and 209 g. of ethylene glycol with 972 g. of dioxane and, after stirring at room temperature for 20 minutes to uniformly dissolve the reactants, there was added thereto 30 g. of dioxane solution containing 1.3 g. of dibutyltin maleate. After addition of the catalyst solution, a liquid heating medium at 80° C. was circulated through the jacket of the blender to effect heat reaction. As the heat reaction proceeds the reaction mixture gradually became viscous and, after two hours, there occurred pulverization of the reaction mixture. The reaction mixture in the form of powder was stirred for an additional two hours. The resulting polyurethane resin containing dioxane was dissolved at room temperature in dimethylformamide to form a solution of a viscosity at 30° C. of 4,000 centipoises and a polymer content of 20%. The solution so formed was spun in water as the coagulating bath in a wet spinning process to form an elastic yarn. The yarn has a size of 120 denier, a tenacity of 0.8 g./d. and an elongation of 800%. The loss in weight of the polymer in the coagulating step was as little as less than 0.01%.

EXAMPLE 3

In a Werner type blender of a capacity of 15 liters there were charged 958 g. of a polyethylene propylene adipate having a hydroxyl value of 58.0 and an acid value of 0.5 wherein the molar ratio of ethylene units to propylene units is 9:1, 670 g. of diphenylmethane diisocyanate and 180 g. of 1,4-butanediol with 1,200 g. of tetrahydrofuran and, after stirring at room temperature for 20 minutes to dissolve the reactants completely and uniformly, there was added thereto a catalyst solution consisting of 18 g. of triethylamine and 82 g. of tetrahydrofuran. Then the heat reaction was conducted at 50° C. for 2.5 hours after the addition of the catalyst solution and there occurred pulverization of the reaction mixture. The reaction mixture was further stirred in the form of powder for an additional two hours and then volatile matters eliminated therefrom at 50° C. under a reduced pressure of 180 mm. Hg to obtain a powdered polyurethane resin having an intrinsic viscosity $[\eta]$ of 0.98 and a melting point of 190–192° C. An artificial leather was produced by impregnating a non-woven fabric composed of a mixed spun fiber prepared in melt spinning from a mixture of 70 parts of 6 nylon and 30 parts of polystyrene with a polyurethane resin solution. In the case where the non-woven fabric was impregnated with a 12% solution in dimethylformamide of the powdered polyurethane prepared in accordance with this example and the resin was coagulated in water, the reduction in weight of the resin was as little as 0.5%. On the other hand where a polyurethane resin having a wide molecular distribution as prepared in a prior art method was used, there occurred precipitation of oligomers which instantly emulsified the coagulating bath. This resulted in a large loss in weight of the polyurethane resin and was undesirable for the procedure.

EXAMPLE 4

400 g. of a polytetramethylene glycol, 250 g. of diphenylmethane diisocyanate and 57 g. of 1,4-butanediol were charged with 165 g. of tetrahydrofuran in a kneader blender of a capacity of 5 liters, and stirred therein at room temperature for 30 minutes until uniformly dissolved. There was then added thereto 10 g. of a catalyst solution of 0.3 g. of dibutyltin dilaurate in tetrahydrofuran. The heat reaction was conducted at 50° C. 50 minutes after the addition of the catalyst solution the reaction mixture became powder in form. The reaction mixture in powder form was further stirred for an additional 3 hours and then there was eliminated therefrom volatile matters to obtain a polyurethane resin having an intrinsic viscosity $[\eta]$ of 0.92 and a melting point of 162–165° C.

EXAMPLE 5

1,550 g. of a polyethylene adipate having a hydroxyl value of 72.0 and an acid value of 0.2, 1,000 g. of diphenylmethane diisocyanate, 465 g. of phenylene bis(hydroxyethyl ether) and 35.7 g. of N-methyldiethanolamine were charged with 1,500 g. of anisole into a Werner type blender of a capacity of 15 liters and stirred at room temperature for 15 minutes to dissolve uniformly. There was then added thereto a catalyst solution prepared by mixing 0.3 g. of dibutyltin dilaurate and 50 g. of anisole. Immediately thereafter steam was circulated through the jacket of the blender to effect heat reaction of the reaction mixture. The reaction mixture gradually became viscous as the reaction proceeded and, after one hour, there occurred pulverization of the reaction mixture. The product was stirred for an additional one hour to obtain a powdered polyurethane resin. Shaped articles made from the polyurethane resin thus formed exhibited a good light fastness and did not exhibit yellow coloration after radiation by ultraviolet rays which is a peculiar characteristics of urethane compounds.

What we claim is:

1. A method for the direct preparation of polyurethane resins in powdered form having (i) good homogeneity, (ii) narrow molecular weight distribution, and (iii) which are capable of being easily and uniformly dissolved in solvent which comprises reacting:

(A) a polyhydroxyl compound having a molecular weight of 300 to 8,000;

(B) an organic polyisocyanate; and (C) a low molecular weight polyl, in the presence of an ether selected from the group consisting of: furan, tetrahydrofuran, methylfurans, dioxane, dioxene, methyl-α-furfuryl ethers, 2,3-dihydropyrane, tetrahydropyrane, pentamethylene oxide, 1,8-cineol, 1,2-dimethoxyethane, 1-methoxy-2-butoxyethane, dichloroethyl ether, dichloromethyl ether, dibutyl ether, methyl chloromethyl ether, benzyl ethyl ether, benzyl methyl ether, anisol, phenetol, diallyl ether, and allyl vinyl ether, while continuously mechanically pulverizing the reaction mixture, said ether being present in an amount of from 5 to 60% by weight, based on the total weight of (A), (B), (C), and said ether, said (A), (B), and (C) being present in proportions such that ratio of moles of (B) to moles of (A) plus (C) is between 0.90:1.00 and 1.15:1.00.

2. The method of claim 1 wherein the process is carried out at a temperature between room temperature and 200° C.

3. The method of claim 2 wherein the pulverizing is continued after the reaction is substantially completed and until the product is in the form of a powder.

4. The method of claim 1 wherein said (A) is polybutylene adipate, said (B) is diphenylmethane-diisocyanate, and (C) is ethylene glycol, and said ether is dioxane.

5. The method of claim 1 wherein said (A) is polyethylene adipate, said (B) is diphenylmethane-diisocyanate, said (C) is a mixture of phenylene-bis(hydroxyethyl-ether) and N-methyldiethanolamine, and said ether is anisol.

6. The method of claim 1 wherein said ether is tetrahydrofuran.

7. The method of claim 1 wherein the polyurethane resin is separated from the ether and recovered as a dry powder.

8. The method of claim 7 wherein said (A) is poly (ethylene/propylene-adipate), said (B) is diphenylmethane-diisocyanate, said (C) is 1,4-butanediol, and said ether is tetrahydrofuran.

9. The method of claim 7 wherein said (A) is polybutylene adipate, said (B) is diphenylmethane-diisocyanate, said (C) is 1,4-butanediol, said ether is tetrahydrofuran, and the reaction mixture is subjected to a pressure of 100 mm. Hg and a temperature of 50° C. to separate and recover the polyurethane resin product as a dry powder from the reaction mixture.

References Cited

UNITED STATES PATENTS

| | | | |
|---|---|---|---|
| 2,917,471 | 12/1959 | Nelson | 260—2.3 |
| 2,929,800 | 3/1960 | Hill | 260—77.5 |
| 3,184,426 | 5/1965 | Thoma et al. | 260—30.8 |
| 3,214,411 | 10/1965 | Saunders et al. | 260—75 |
| 3,310,533 | 3/1967 | McElroy | 260—77.5 |

DONALD E. CZAJA, *Primary Examiner.*

F. McKELVEY, *Assistant Examiner.*

U.S. Cl. X.R.

117—138.8; 260—18, 75, 77.5; 264—184